United States Patent
Yokoo et al.

(10) Patent No.: US 9,815,134 B2
(45) Date of Patent: Nov. 14, 2017

(54) IMPELLER BRAZING METHOD

(71) Applicant: MITSUBISHI HEAVY INDUSTRIES, LTD., Tokyo (JP)

(72) Inventors: Kazutoshi Yokoo, Tokyo (JP); Daisuke Tanaka, Tokyo (JP); Daisuke Kawada, Tokyo (JP); Koshiro Niihara, Tokyo (JP); Hiroki Takagi, Tokyo (JP); Yujiro Watanabe, Tokyo (JP); Hiroshi Nakajima, Tokyo (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 15/402,602

(22) Filed: Jan. 10, 2017

(65) Prior Publication Data

US 2017/0144241 A1    May 25, 2017

Related U.S. Application Data

(62) Division of application No. 13/984,904, filed as application No. PCT/JP2011/006500 on Nov. 22, 2011, now Pat. No. 9,566,655.

(30) Foreign Application Priority Data

Feb. 22, 2011 (JP) .................................. 2011-035308
Feb. 22, 2011 (JP) .................................. 2011-035309

(51) Int. Cl.
*B23K 1/008* (2006.01)
*B23K 1/00* (2006.01)
(Continued)

(52) U.S. Cl.
CPC ............ *B23K 1/0018* (2013.01); *B23K 1/008* (2013.01); *B23K 35/3013* (2013.01);
(Continued)

(58) Field of Classification Search
CPC .... B23K 1/0008; B23K 1/0018; B23K 1/008; B23K 2201/001; B23K 35/3066; F04D 29/023; F04D 29/284
See application file for complete search history.

(56) References Cited

U.S. PATENT DOCUMENTS 5,427,305 A     6/1995 Nishimura
5,632,435 A     5/1997 Schmied et al.
(Continued)

FOREIGN PATENT DOCUMENTS

CN     1426338     6/2003
CN     101074456   11/2007
(Continued)

OTHER PUBLICATIONS

Extended European Search Report dated Jun. 14, 2017 in European Application No. 11859305.2.
(Continued)

*Primary Examiner* — Erin Saad
*Assistant Examiner* — Carlos Gamino
(74) *Attorney, Agent, or Firm* — Wenderoth, Lind & Ponack, L.L.P.

(57) ABSTRACT

The present invention relates to an impeller manufacturing method in which a thermal cycle is performed on an assembly body with a brazing material formed of a Ni-containing Au alloy being placed at a bond portion of at least two impeller constituent members. The thermal cycle includes a temperature increasing process with a temperature increasing rate of 20° C./hr. to 100° C./hr., the process including a first intermediate retention and a second intermediate retention each keeping the temperature, the first intermediate retention performed in a temperature range of 500° C. to 850° C. and the second intermediate retention performed in a temperature range of 850° C. to 950° C. (but not including
(Continued)

850° C.). In the thermal cycle, the temperature is increased in a temperature range exceeding 950° C. after the second intermediate retention at a rate lower than that before the second intermediate retention.

8 Claims, 7 Drawing Sheets

(51) Int. Cl.

| | |
|---|---|
| *B23K 35/30* | (2006.01) |
| *C22C 5/02* | (2006.01) |
| *C22C 38/48* | (2006.01) |
| *C22C 38/42* | (2006.01) |
| *C22C 38/04* | (2006.01) |
| *C22C 38/02* | (2006.01) |
| *C22C 38/00* | (2006.01) |
| *C21D 9/00* | (2006.01) |
| *C21D 1/78* | (2006.01) |
| *F04D 29/28* | (2006.01) |
| *F04D 29/02* | (2006.01) |

(52) U.S. Cl.
CPC ............ *C21D 1/785* (2013.01); *C21D 9/0068* (2013.01); *C22C 5/02* (2013.01); *C22C 38/002* (2013.01); *C22C 38/02* (2013.01); *C22C 38/04* (2013.01); *C22C 38/42* (2013.01); *C22C 38/48* (2013.01); *F04D 29/023* (2013.01); *F04D 29/284* (2013.01)

(56) References Cited

U.S. PATENT DOCUMENTS

| | | |
|---|---|---|
| 6,282,785 B1 | 9/2001 | Kolodziej et al. |
| 6,629,368 B2 | 10/2003 | Schnell et al. |
| 7,632,362 B2 | 12/2009 | Konter et al. |
| 7,789,288 B1 | 9/2010 | Johnson et al. |
| 7,832,620 B2 | 11/2010 | Berger et al. |
| 8,042,726 B2 | 10/2011 | Herber et al. |
| 8,127,443 B2 | 3/2012 | Fint et al. |
| 2003/0057263 A1 | 3/2003 | Beedon et al. |
| 2006/0131359 A1 | 6/2006 | Pohlman |
| 2008/0237195 A1 | 10/2008 | Iwasa et al. |
| 2010/0196163 A1 | 8/2010 | Yagi et al. |

FOREIGN PATENT DOCUMENTS

| | | |
|---|---|---|
| DE | 3841093 | 6/1990 |
| JP | 58-151958 | 9/1983 |
| JP | 4-138869 | 5/1992 |
| JP | 8-159088 | 6/1996 |
| JP | 2003-531731 | 10/2003 |
| JP | 2010-180721 | 8/2010 |
| JP | 2011-241704 | 12/2011 |

OTHER PUBLICATIONS

International Search Report dated Feb. 28, 2012 in International (PCT) Application No. PCT/JP2011/006500.
Office Action dated Jan. 4, 2015 in corresponding Chinese Application No. 201180064799.5, with partial English translation.
CN 101074456 A English Machine Translation, 2007.

FIG. 3

| # | First Intermediate Retention Temperature [°C] | First Intermediate Retention Time [hr] | Second Intermediate Retention Temperature [°C] | Second Intermediate Retention Time [hr] | Temperature Increasing Rate Before Second Intermediate Retention [°C/hr] | Temperature Increasing Rate After Second Intermediate Retention [°C/hr] | Retaining Process Temperature [°C] | Retaining Process Time [hr] | Temperature Decreasing Rate [°C/hr] | Retention at the Time of Temperature Decrease | Blazing Evaluation | Notes |
|---|---|---|---|---|---|---|---|---|---|---|---|---|
| 1 | - | - | 900 | 4 | 80 | 60 | 1030 | 1 | 60 | - | × | Temperature evaluation of first intermediate retention |
| 2 | 450 | 4 | 900 | 4 | 80 | 60 | 1030 | 1 | 60 | - | △ | |
| 3 | 550 | 4 | 900 | 4 | 80 | 60 | 1030 | 1 | 60 | - | ○ | |
| 4 | 650 | 4 | 900 | 4 | 80 | 60 | 1030 | 1 | 60 | - | ○ | |
| 5 | 750 | 4 | 900 | 4 | 80 | 60 | 1030 | 1 | 60 | - | ○ | |
| 6 | 850 | 4 | 900 | 4 | 80 | 60 | 1030 | 1 | 60 | - | ○ | |
| 7 | 600 | 4 | - | - | 80 | 60 | 1030 | 1 | 60 | - | × | Temperature evaluation of second intermediate retention |
| 8 | 600 | 4 | 800 | 4 | 80 | 60 | 1030 | 1 | 60 | - | △ | |
| 9 | 600 | 4 | 850 | 4 | 80 | 60 | 1030 | 1 | 60 | - | ○ | |
| 10 | 600 | 4 | 875 | 4 | 80 | 60 | 1030 | 1 | 60 | - | ○ | |
| 11 | 600 | 4 | 900 | 4 | 80 | 60 | 1030 | 1 | 60 | - | ○ | |
| 12 | 600 | 4 | 950 | 4 | 80 | 60 | 1030 | 1 | 60 | - | ○ | |
| 13 | 600 | 4 | 900 | 4 | 25 | 25 | 1030 | 1 | 60 | - | ○ | Temperature increasing rate before second intermediate retention |
| 14 | 600 | 4 | 900 | 4 | 50 | 40 | 1030 | 1 | 60 | - | ○ | |
| 15 | 600 | 4 | 900 | 4 | 75 | 60 | 1030 | 1 | 60 | - | ○ | |
| 16 | 600 | 4 | 900 | 4 | 100 | 60 | 1030 | 1 | 60 | - | ○ | |
| 17 | 600 | 4 | 900 | 4 | 125 | 60 | 1030 | 1 | 60 | - | × | |
| 18 | 600 | 4 | 900 | 4 | 50 | 40 | 1030 | 1 | 60 | - | ○ | Temperature increasing rate after second intermediate retention |
| 19 | 600 | 4 | 900 | 4 | 65 | 70 | 1030 | 1 | 60 | - | × | |
| 20 | 600 | 4 | 900 | 4 | 85 | 95 | 1030 | 1 | 60 | - | × | |
| 21 | 600 | 4 | 875 | 4 | 80 | 60 | 1030 | 1 | 25 | - | ○ | Rate evaluation of temperature decreasing rate in temperature decreasing process |
| 22 | 600 | 4 | 875 | 4 | 80 | 60 | 1030 | 1 | 50 | - | ○ | |
| 23 | 600 | 4 | 875 | 4 | 80 | 60 | 1030 | 1 | 75 | - | ○ | |
| 24 | 600 | 4 | 875 | 4 | 80 | 60 | 1030 | 1 | 100 | - | ○ | |
| 25 | 600 | 4 | 875 | 4 | 80 | 60 | 1030 | 1 | 60 | 950h°C × 1hr | ○ | |

FIG. 6

| TEST SAMPLE NO. | HEIGHT OF FIRST HEATING UNIT (h1) (h=HEIGHT OF ASSEMBLY BODY) | TEMPERATURE INCREASING PROCESS | | | | | RETAINING PROCESS (SOLUTION HEAT TREATMENT) | | TEMPERATURE DECREASING PROCESS | | BLAZING EVALUATION | NOTES |
|---|---|---|---|---|---|---|---|---|---|---|---|---|
| | | FIRST INTERMEDIATE RETENTION | | SECOND INTERMEDIATE RETENTION | | TEMPERATURE INCREASING RATE [°C/hr.] | TEMPERATURE [°C] | TIME [hr.] | TEMPERATURE DECREASING RATE [°C/hr.] | RETENTION AT THE TIME OF TEMPERATURE DECREASE | | |
| | | TEMPERATURE [°C] | RETENTION TIME [hr.] | TEMPERATURE [°C] | RETENTION TIME [hr.] | | | | | | | |
| 1 | 0 | 600 | 4 | – | – | 250 | 1010 | 1 | 60 | – | × | EVALUATION OF HEIGHT OF FIRST HEATING UNIT |
| 2 | 0.5h | 600 | 4 | – | – | 250 | 1010 | 1 | 60 | – | △ | |
| 3 | h | 600 | 4 | – | – | 250 | 1010 | 1 | 60 | – | ○ | |
| 4 | 2h | 600 | 4 | – | – | 250 | 1010 | 1 | 60 | – | ○ | |
| 5 | 3h | 600 | 4 | – | – | 250 | 1010 | 1 | 60 | – | ○ | |
| 6 | 5h | 600 | 4 | – | – | 250 | 1010 | 1 | 60 | – | ○ | |
| 7 | 7h | 600 | 4 | – | – | 250 | 1010 | 1 | 60 | – | ○ | |
| 8 | 10h | 600 | 4 | – | – | 250 | 1010 | 1 | 60 | – | ○ | |
| 9 | 20h | 600 | 4 | – | – | 250 | 1010 | 1 | 60 | – | ○ | |
| 10 | 0.5h | 800 | 4 | – | – | 350 | 1010 | 1 | 60 | – | △ | EVALUATION OF HEIGHT OF FIRST HEATING UNIT WHEN TEMPERATURE INCREASING RATE IS INCREASED |
| 11 | 3h | 800 | 4 | – | – | 350 | 1010 | 1 | 60 | – | ○ | |
| 12 | 3h | 480 | 4 | – | – | 250 | 1010 | 1 | 60 | – | △ | TEMPERATURE EVALUATION OF FIRST INTERMEDIATE RETENTION |
| 13 | 3h | 500 | 4 | – | – | 250 | 1010 | 1 | 60 | – | ○ | |
| 14 | 3h | 550 | 4 | – | – | 250 | 1010 | 1 | 60 | – | ○ | |
| 15 | 3h | 700 | 4 | – | – | 250 | 1010 | 1 | 60 | – | ○ | |
| 16 | 3h | 750 | 4 | – | – | 250 | 1010 | 1 | 60 | – | ○ | |
| 17 | 3h | 850 | 4 | – | – | 250 | 1010 | 1 | 60 | – | ○ | |
| 18 | 3h | 700 | 3 | 845 | 2 | 250 | 1010 | 1 | 60 | – | △ | TEMPERATURE EVALUATION OF SECOND INTERMEDIATE RETENTION |
| 19 | 3h | 700 | 3 | 850 | 2 | 250 | 1010 | 1 | 60 | – | ○ | |
| 20 | 3h | 700 | 3 | 880 | 2 | 250 | 1010 | 1 | 60 | – | ○ | |
| 21 | 3h | 700 | 3 | 920 | 2 | 250 | 1010 | 1 | 60 | – | ○ | |
| 22 | 3h | 700 | 3 | 940 | 2 | 250 | 1010 | 1 | 60 | – | ○ | |
| 23 | 3h | 700 | 3 | 950 | 2 | 250 | 1010 | 1 | 60 | – | ○ | |
| 24 | 3h | 600 | 3 | 900 | 2 | 65 | 1010 | 1 | 60 | – | △ | EVALUATION OF TEMPERATURE INCREASING RATE UNTIL RETAINING PROCESS |
| 25 | 3h | 600 | 3 | 900 | 2 | 430 | 1010 | 1 | 60 | – | △ | |
| 26 | 3h | 600 | 3 | 875 | 2 | 250 | 1030 | 1 | 25 | – | ○ | RATE EVALUATION OF TEMPERATURE DECREASING RATE IN TEMPERATURE DECREASING PROCESS |
| 27 | 3h | 600 | 3 | 875 | 2 | 250 | 1030 | 1 | 50 | – | ○ | |
| 28 | 3h | 600 | 3 | 875 | 2 | 250 | 1030 | 1 | 75 | – | ○ | |
| 29 | 3h | 600 | 3 | 875 | 2 | 250 | 1030 | 1 | 100 | – | ○ | |
| 30 | 3h | 600 | 3 | 875 | 2 | 250 | 1030 | 1 | 200 | – | △ | |
| 31 | 3h | 600 | 3 | 875 | 2 | 250 | 1030 | 1 | 60 | 950h°C×1hr | ○ | |

IMPELLER BRAZING METHOD

TECHNICAL FIELD

The present invention relates to a method of manufacturing an impeller (a rotary wing) for use in a centrifugal compressor or another rotary machine.

BACKGROUND ART

For example, as shown in FIG. 7A and FIG. 7B, an impeller 10a of a centrifugal compressor is fixed to a rotational main shaft of a centrifugal compressor not shown via a shaft hole 16 provided on an inner circumferential side, and is configured to include a disk 11 with one surface curved to be thinner to the tip, a cover 12 in a shape of facing the curved surface of the disk 11, and many blades 13 provided so as to section a space between the curved surfaces of the disk 11 and the cover 12 into a vortex shape.

Types of this impeller 10 include one called a three-piece type in which the disk 11, the cover 12, and the blades 13 are independently produced and mutually bonded for assembly and one called a two-piece type in which the cover 12 and the blades 13 (or the disk 11 and the blades 13) are integrally fabricated and bonded to the disk 11 (or the cover 12) fabricated independently therefrom. In both of the impellers 10 of the three-piece type and the two-piece type, bonding is performed by welding or brazing. Whether welding or brazing is performed for bonding is determined according to the size, strength, or others of the impeller 10. Note that the impeller 10 shown in FIG. 7A and FIG. 7B is of the two-piece type, illustrating an example in which the disk 11 and the cover 12 integrally fabricated with the blades 13 are bonded with a brazing part 14.

Bonding by brazing has a thermal cycle in which, with a brazing material made of, for example, an Au—Ni alloy, being interposed between members to be bonded (for example, between the disk 11 and the blades 13), the temperature is increased to a brazing temperature equal to or higher than the melting temperature of the brazing material, the state is held for a set period, and then cooling is performed.

Bonding by brazing has the following advantages.

Since the brazing temperature and the temperature in a solution heat treatment of a material (precipitation-hardening-type stainless steel) configuring the impeller 10 can be made within the same temperature range, the heat treatment for brazing and the solution heat treatment can be performed in a united manner.

Also, compared with the impeller 10 fabricated by welding, the impeller 10 fabricated by brazing deforms less, and is unbalanced less.

Furthermore, since a brazing process is performed under vacuum, the surface of the impeller 10 after the process is cleaned, a process of removing an oxide coating later can be eliminated, and dimensional accuracy required can be easily ensured.

An impeller manufacturing method by brazing with the advantages as described above is disclosed in Patent Document 1.

With a quenching process starting at a temperature slightly lower than that of the liquid phase of the brazing material, the strength of a brazed bonded part is insufficient, resulting in a crack in the brazed bonded part. An object of Patent Document 1 is to solve the problem of the conventional brazing method as described above.

Patent Document 1 suggests a brazing thermal cycle, a typical example of which is shown in FIG. 1 of Patent Document 1. In FIG. 1, an assembly body to be brazed is heated for approximately six hours to a temperature of the liquid phase or a liquidus temperature of the brazing material, that is, approximately 1850 Fahrenheit degrees (1010° C.), and that temperature is retained for about one hour. In the course of this temperature increase, a temperature of 1200 Fahrenheit degrees (650° C.) is retained for approximately one hour. Furthermore, the brazed assembly body is cooled for approximately two hours to approximately 1300 Fahrenheit degrees (704.4° C.), and then the temperature of the assembly body is lowered for one hour to a temperature of approximately 350 Fahrenheit degrees (176.7° C.) for gas quenching. Patent Document 1 states that, with this thermal cycle, the rotary wing assembly body does not exhibit thermally-induced distortion, the entire brazed bonded part is solid, and no crack occurs. Note that Patent Document 1 recommends JIS SUS630 as a stainless steel configuring each member of the impeller and an alloy containing 80% to 85% gold (Au) and 15% to 20% nickel (Ni) (this may be hereinafter abbreviated as a Ni—Au alloy) as the brazing material. In the specification of the present application, % means a percentage by mass.

CITATION LIST

Patent Document

Patent Document 1: Japanese Patent Application Laid-Open (Translation of PCT Application) No. 2003-531731

SUMMARY OF THE INVENTION

Technical Problems to be Solved by the Invention

As described above, according to Patent Document 1, an impeller can be fabricated by a brazing method without causing a crack.

However, it has been found that there is a possibility that a gap may occur between the disk 11 and the blades 13, which are supposed to have been bonded via the brazing material, due to a difference in generation temperature during a heat treatment when brazing is performed with the thermal cycle of Patent Document 1. Since the portion where this gap occurs is not bonded via the brazing material (a brazing defect), the impeller with the occurrence of a significant gap is handled as a defective product, or brazing is performed again.

The present invention was made based on this problem, and has an object of providing an impeller manufacturing method capable of reducing brazing defects.

Solution to the Problems

To investigate the cause of a brazing defect, the present inventors have conducted studies from several aspects. As a result, it has been confirmed that a distribution of temperature occurs in the impeller in a thermal cycle of brazing. With the occurrence of the distribution in temperature to the impeller, a space at the bond interface may be expanded due to a difference in heat distortion amount occurring accordingly. The brazing material molten in the thermal cycle is retained in the space by capillary action. If this space is too expanded, the brazing material that becomes not retainable leaks to the outside.

Thus, the inventors have conducted studies in view of suppressing expansion of the space and, as a result, conceived the present invention as described below.

A first aspect of the present invention relates to an impeller manufacturing method in which a thermal cycle is performed, for bonding, on an assembly body with a brazing material interposed at a bond portion between at least two impeller constituent members, and has a characteristic in this thermal cycle.

The thermal cycle according to the first aspect of the present invention includes a temperature increasing process I of increasing a temperature to a retention temperature, a retaining process II of retaining the temperature at the retention temperature in a temperature range equal to or higher than a melting temperature of the brazing material, and a temperature decreasing process III of decreasing the temperature from the retention temperature to a room temperature.

In the temperature increasing process, a temperature increasing rate is assumed to be 20° C./hr. to 100° C./hr.

In the temperature increasing process, a first intermediate retention and a second intermediate retention for keeping the temperature are provided. The first intermediate retention is performed in a temperature range of 500° C. to 850° C. The second intermediate retention is performed in a temperature range of 850° C. to 950° C. (but not including 850° C.).

Also, in the temperature increasing process, in a temperature range exceeding 950° C. after the second intermediate retention, the temperature is increased at a rate slower than a rate before the second intermediate retention. However, it is presumed that the rate at this time is also within the range of 20° C./hr. to 200° C./hr.

The retention temperature in the retaining process of the first aspect of the present invention is selected from a range of 1000° C. to 1050° C.

It is preferable in achieving the object of the first aspect of the present invention that, in the temperature decreasing process of the first aspect of the present invention, a temperature decreasing rate is 20° C./hr. to 100° C./hr., and from the retention temperature to 950° C., the temperature is decreased at a rate slower than the temperature decreasing rate at a lower temperature.

Also, the inventors have further conducted studies in view of suppressing expansion of the space at the bond interface and found that a distribution in temperature of the impeller occurs mainly on an inner circumferential side and an outer circumferential side of the impeller. Specifically, the impeller has a temperature on the inner circumferential side lower than the temperature on the outer circumferential side. This is because a heating furnace for brazing the impeller normally includes a heater only inside the heating furnace and therefore the temperature of the inner circumferential side of the impeller far away from the heater is less prone to increase compared with the outer circumferential side near the heater. Also, it is desired to reduce the time required for the brazing thermal cycle. Thus, the present inventors have conceived the present invention as described below to reduce the time of the brazing thermal cycle while complementing a temperature increase on the inner circumferential side of the impeller (the assembly body).

A second aspect of the present invention relates to an impeller manufacturing method in which a thermal cycle is performed, for bonding, on an assembly body with a brazing material placed at a bond portion between at least two impeller constituent members, the thermal cycle including a temperature increasing process I of increasing a temperature to a retention temperature, a retaining process II of retaining the temperature at the retention temperature in a temperature range equal to or higher than a melting temperature of the brazing material, and a temperature decreasing process III of decreasing the temperature from the retention temperature to a room temperature, and has a feature in performing the thermal cycle with the assembly body being placed with respect to a first heating body heating the assembly body from an inner circumferential side of the assembly body.

With the first heating body heating the assembly body from the inner circumferential side of the assembly body being placed, distributions of temperature on the inner circumferential side and the outer circumferential side of the assembly body are reduced, and expansion of the space at the bond interface can be inhibited. Therefore, according to the second aspect of the present invention, brazing can be excellently performed.

The first heating body of the second aspect of the present invention is preferably integrally provided together with a second heating body supporting the assembly body from below in a vertical direction.

It is preferable to use the second heating body to actively supply heat to a lower surface side of the assembly body less prone to receive heat from the heater in the thermal cycle. With the second heating body and the first heating body being integrally configured, an operation of placing the first heating body and the second heating body with respect to the assembly body becomes easy.

If the height of the first heating body is low with respect to the assembly body, the amount of heat to be given from the first heating body to the assembly body is small, and therefore the effect of reducing the distribution of temperature may possibly not be able to be sufficiently obtained. On the other hand, if the height of the first heating body is too high with respect to the assembly body, the effect of reducing the distribution of temperature cannot be obtained even further. Thus, the first heating body of the second aspect of the present invention preferably satisfies $0.5h_2 \leq h_1 \leq 20h_2$ where $h_1$ is a height of the first heating body and $h_2$ is a height of the assembly body.

Advantageous Effects of Invention

According to the first aspect of the present invention, by controlling the temperature increasing rate in the temperature increasing process in the brazing thermal cycle and also providing an intermediate retention, the occurrence of a gap at the brazing interface due to heat distortion of the constituent member and a defect in the brazing material can be inhibited.

Also, according to the second aspect of the present invention, when the brazing thermal cycle is performed on the assembly body formed of constituent members of the impeller, a heating body heating the assembly body from the inner circumferential side is placed, thereby suppressing extension of the space at the brazing interface due to heat distortion of a constituent member and inhibiting a defect in the brazing material. Furthermore, by performing the brazing thermal cycle with a heating body being placed, the temperature increasing rate in the temperature increasing process can be increased, and the brazing thermal cycle can be performed in a short time.

BRIEF DESCRIPTION OF DRAWINGS

FIG. 3 is a table of results of observation of a brazing state of a test sample obtained by fluctuating the thermal cycle at the time of brazing (a solution heat treatment) in the first embodiment.

FIG. 6 is a table of results of observation of a test sample obtained by fluctuating the thermal cycle at the time of brazing (a solution heat treatment) in the second embodiment.

DESCRIPTION OF EMBODIMENTS

Figure 1:
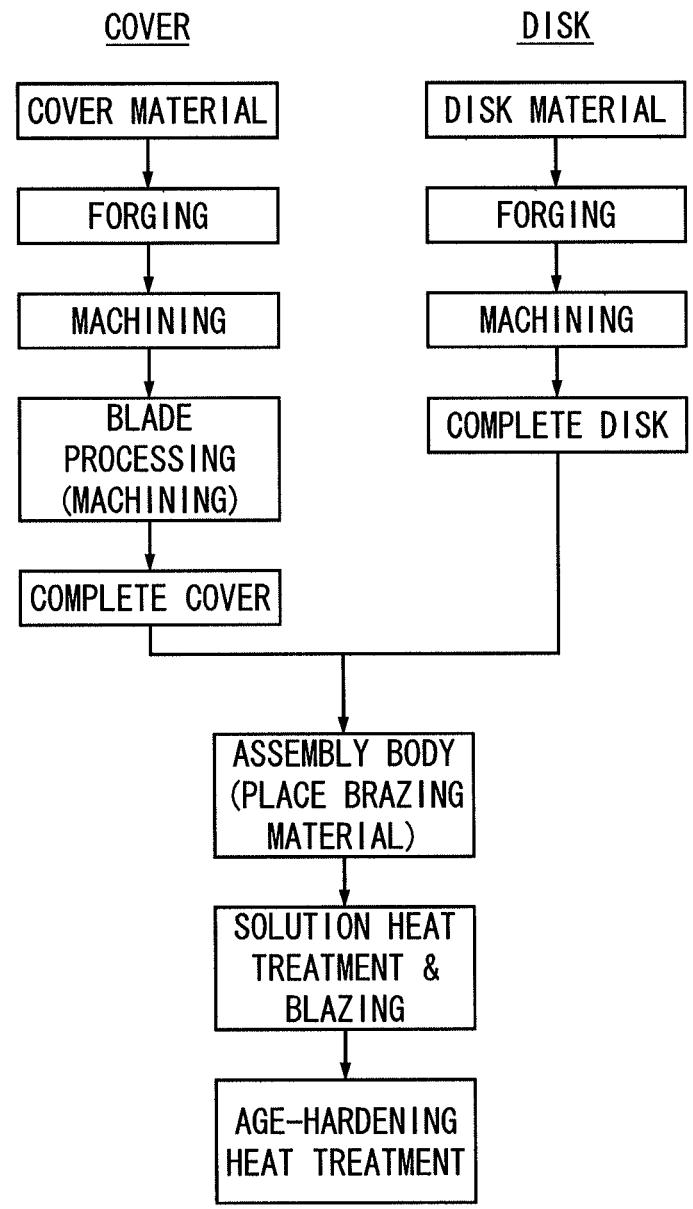
FIG. 1 is a flowchart of an impeller manufacturing process in first and second embodiments.

The invention is described in detail below based on embodiments. Note that a series of processes described below are shown in FIG. 1 for reference.

Figure 7A:
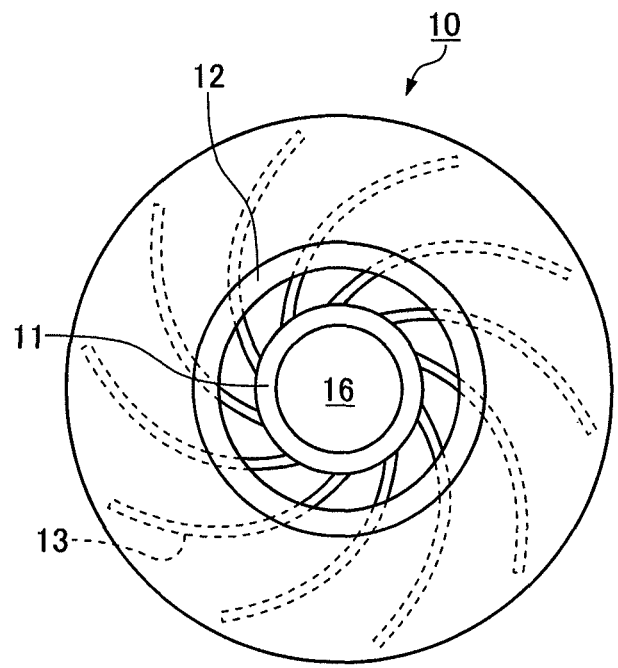
FIGS. 7A and 7B show an example of an impeller of a centrifugal compressor, FIG. 7A being a plan view of the impeller and FIG. 7B being a half sectional view of the impeller along a blade of the impeller.
Figure 7B:
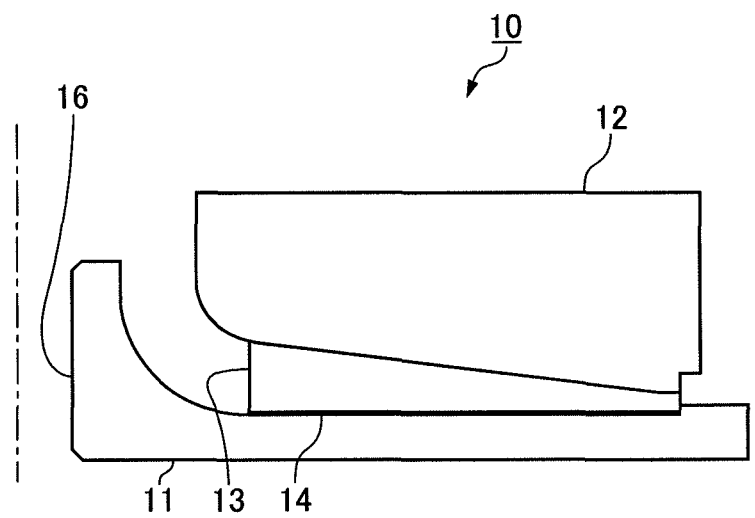

In the present embodiments, in both of first and second embodiments, an impeller of the two-piece type shown in FIG. 7A and FIG. 7B is taken as an example for description. However, it goes without saying that the present invention can be applied even when an impeller of a two-piece type in which the blades 13 are integrally formed with the disk 11 or an impeller of a three-piece type in which the blades 13, the disk 11, and the cover 12 are independently fabricated and then bonded together is manufactured.

1. First Embodiment

<Cover Material and Disk Material>

Raw materials for the disk 11 and the cover 12 are each prepared. This raw material is provided as a rod-shaped steel material. This raw material basically has the following chemical composition (mass %) stipulated in SUS630. SUS630 stipulates a stainless steel of a precipitation hardening type in which Cu is solved in a base by a solution heat treatment and a fine Cu—Ni intermetallic compound is then precipitated by an age-hardening heat treatment to improve the strength of the steel. Note that an element other than the following elements that is capable of improving the characteristics of SUS630 may be included.

<SUS630 Chemical Composition (Reference Values)>
Cr: 15.5% to 17.5% (preferably 15.5% to 17.0%)
Ni: 3.0% to 5.0% (preferably 3.5% to 4.5%)
Cu: 3.0% to 5.0% (preferably 3.0% to 4.0%)
Nb+Ta: 0.15% to 0.40% (preferably 0.3% to 0.40%)
C: 0.07% or lower
Si: 1.0% or lower
Mn: 1.0% or lower
P: 0.004% or lower
S: 0.03% or lower
The balance: Fe and inevitable impurities <Forging-Machining>

The raw materials for the disk 11 and the cover 12 are each forged and machined to be processed in the shapes of the disk 11 and the cover 12, respectively. At the center of the disk 11 in a diameter direction, a shaft hole 16 is formed. For example, a rotary main shaft of a centrifugal compressor fits in this shaft hole 16. Since the cover 12 integrally includes the blades 13, a machining process for forming the blades 13 is performed.

<Assembling>

Bond surface sides of the fabricated disk 11 and cover 12 integrally provided with the blades 13 are caused to abut on each other to obtain an assembly body. Note that the cover 12 causes a blade 13 side to face the bond surface side of the disk 11. Between these abutting surfaces, a brazing material is placed. Here, to ensure the thickness of the brazing material after brazing, a jig can be used to retain the space between the abutting surfaces of the disk 11 and the cover 12.

<Brazing Material>

The brazing material for use in the present embodiment is an alloy containing Ni with Au as a base. This gold brazing material contains 15% to 25% of Ni, and the balance is formed of Au and inevitable impurities. With this composition range, good wettability with respect to the base material (the disk 11 and the blades 13) and high bond strength can be obtained. As the gold brazing material, the one having a melting point (a liquidus temperature) on the order of 900° C. to 1050° C., which is lower than the retention temperature of SUS630 in the solution heat treatment, is used. The gold brazing material preferably has a chemical composition of 16% to 19% Ni-81% to 84% Au, more preferably a chemical composition of 17.5% to 18.5% Ni-81.5% to 82.5% Au. The gold brazing material typically has a composition of 18% Ni—Au, and has a melting point on the order of 900° C. to 1000° C.

The form of the brazing material interposed between the abutting surfaces can be any. Any form known in brazing can be used, for example, a thin film, a thin strap, a linear material, powder, or paste. However, the form is required to satisfy the thickness of the brazing material after brazing set to ensure toughness of a bond portion.

<Heat Treatment (Brazing Thermal Cycle)>

After the disk 11 and the cover 12 (the blades 13) are assembled via the brazing material, the assembly body is inserted into the heat furnace for a heat treatment. The heat treatment includes two stages, that is, a solution heat treatment and an age-hardening heat treatment, as shown in FIG. 1, and is performed under vacuum. The brazing thermal cycle is performed so as to serve also as the solution heat treatment. These cycle and treatment are hereinafter collectively referred to a brazing thermal cycle. The age-hardening heat treatment can be performed after the brazing thermal cycle (the solution heat treatment) ends, and also can be performed in a temperature decreasing process in the brazing thermal cycle. Suitable conditions of a series of heat treatments are described below.

[Brazing Thermal Cycle]

Figure 2:
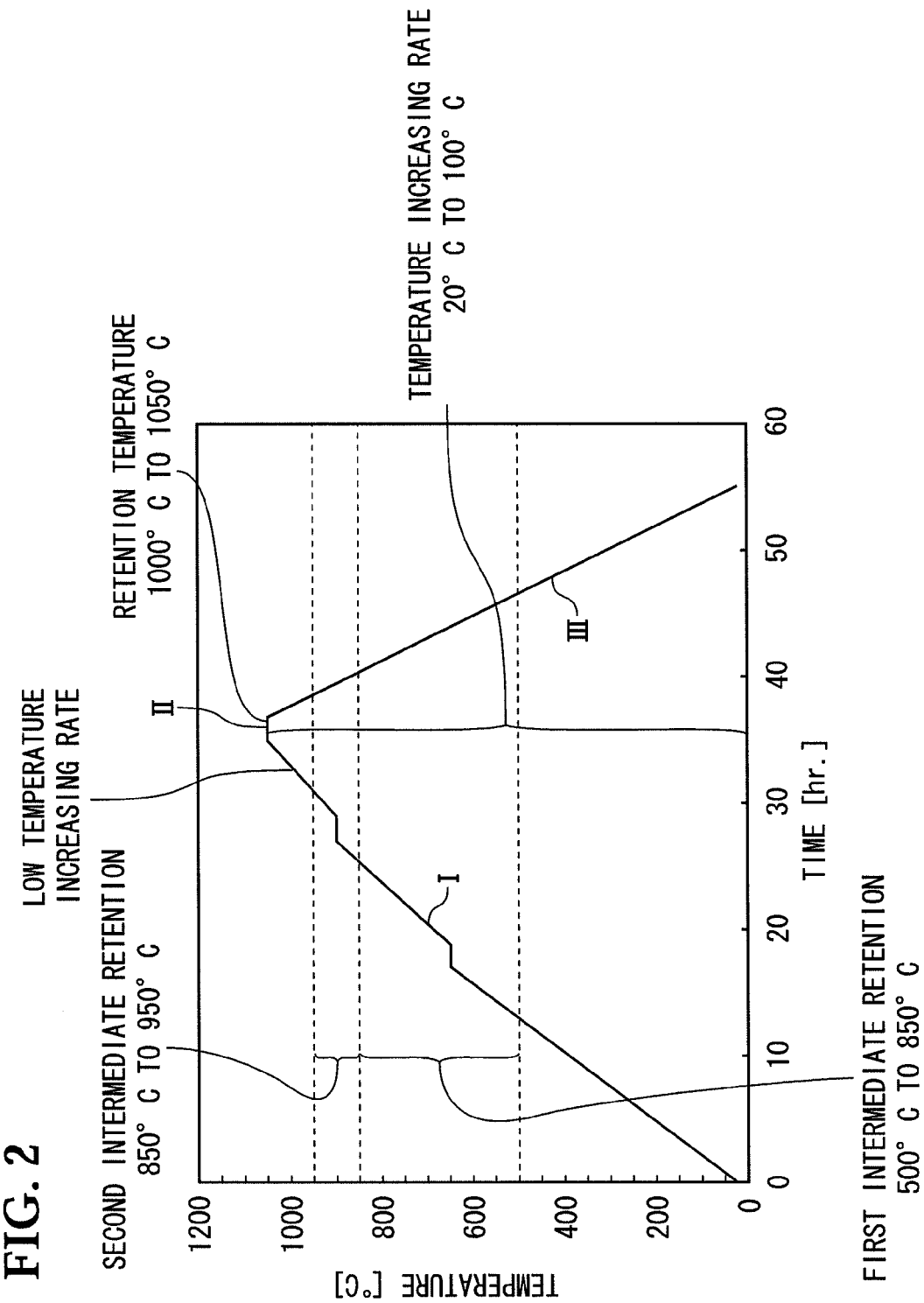
FIG. 2 is a drawing of one pattern of a thermal cycle at the time of brazing (a solution heat treatment) in the first embodiment.

As shown in FIG. 2, the brazing thermal cycle can be sectioned into a temperature increasing process (I), a retaining process (II), and a temperature decreasing process (III).

The temperature increasing process is normally started from a room temperature, and the temperature inside the furnace (the assembly body) is increased to a retention temperature.

[Temperature Increasing Process]

In the first embodiment, a temperature increasing rate in the temperature increasing process is set at 20° C./hr. to 100° C./hr. This is to prevent a distribution of temperature from occurring in the assembly body during the temperature increasing process or, even if it occurs, to suppress to the extent that the brazing material does not leak from the bond interface.

To prevent a distribution of temperature from occurring in the assembly body, the temperature increasing rate is made slower. However, if the rate is too slow, it takes too much time in the brazing thermal cycle, resulting in an increase in manufacturing cost of the impeller 10. Moreover, it is not easy to control a slow temperature increasing rate, and an expensive heating furnace is required. Therefore, the temperature increasing rate is set to be equal to or higher than 20° C./hr. A preferable lower limit of the temperature increasing rate is 30° C./hr., and a further preferable lower limit of the temperature increasing rate is 50° C./hr.

On the other hand, if the temperature increasing rate becomes faster, the distribution of temperature occurring in the assembly body is increased. Thus, in the first embodiment, an upper limit of the temperature increasing rate is set to be equal to or lower than 100° C./hr. A preferable upper limit of the temperature increasing rate is 80° C./hr., and a more preferable upper limit of the temperature increasing rate is 70° C./hr.

The time required for the temperature increasing process depends on the temperature increasing rate, the time required for intermediate retention described next, or the side of the impeller 10, and therefore cannot be uniquely determined. However, also in consideration of the manufacturing cost of the impeller 10, fifty hours or less are desired.

The temperature increasing rate described above is applied throughout the temperature increasing process. That is, the temperature increasing rate is applied from the time when the temperature increase starts to the time until the retention temperature (the retaining process). However, this temperature increasing rate is not applied to the intermediate retention described next. The temperature increasing rate is not required to be constant, and can be fluctuated in a range of 20° C./hr. to 100° C./hr. Typically, in a temperature range exceeding 900° C. to 950° C., a temperature increasing rate slower than that in a lower temperature range is selected.

[Intermediate Retention]

In the temperature increasing process, a first intermediate retention and a second intermediate retention for retaining the temperature are provided. Note that the first intermediate retention and the second intermediate retention are collectively referred to as intermediate retention. The first intermediate retention is performed in a temperature range of 500° C. to 850° C. The second intermediate retention is performed in a temperature range of 850° C. to 950° C. (but not including 850° C.).

As described above, the temperature increasing rate is set to be equal to or lower than 100° C./hr to prevent a distribution of temperature from occurring in the assembly body in the temperature increasing process, but this is not sufficient to avoid a distribution of temperature. Thus, in the first embodiment, the intermediate retention is introduced to make the distribution of temperature of the assembly body more uniform.

In the first embodiment, the intermediate retention is configured of the first intermediate retention and the second intermediate retention. These two stages of intermediate retention are provided because it is not sufficient to inhibit a brazing defect only with either one of these intermediate retentions. That is, in the temperature increasing process, the distribution of temperature occurring in the assembly body increases as the temperature relatively increases. Thus, the provision of the intermediate retention in a high temperature range is effective to make the temperature of the assembly body uniform. However, if a distribution of temperature occurs in the assembly body in a relatively low temperature range, a gap occurs at the bond interface at that moment and, even if the temperature is tried to be made uniform in the high temperature range, there is a possibility that appropriate brazing cannot be made because of an increase of the gap between brazing surfaces, a positional deviation of the placed brazing material, or others due to deformation in the temperature increasing process. In particular, the precipitation-hardening-type stainless steel such as SUS630 becomes prone to be deformed as the strength is abruptly decreased when the temperature exceeds an aging temperature, and therefore a gap may possibly be extended when the temperature passes the aging temperature in the temperature increasing process. In view of this, two stages, that is, the first intermediate retention and the second intermediate retention, are provided in the first embodiment.

In the first intermediate retention, if the temperature is lower than 500° C., the distribution of temperature in the assembly body is small, and therefore an effect in line with the intermediate retention cannot be obtained even if the intermediate retention is performed. Also, if the temperature exceeds 850° C., the effect of reducing the gap at a relatively low temperature described above cannot be obtained. Thus, the first intermediate retention is performed in a temperature range of 500° C. to 850° C. The first intermediate retention is preferably performed in a temperature range of 550° C. to 750° C., and is more preferably performed in a temperature range of 550° C. to 700° C.

The retention time in the first intermediate retention should be determined according to the size of the assembly body or the like. Since the effect of making the temperature uniform is insufficient with a short time and the temperature is made uniform with an approximately constant time per unit plate thickness of the impeller, the retention time is set on the order of one to ten hours in consideration of the thickness of the impeller. This retention time is applied also to the second intermediate retention.

The first intermediate retention allows two or more stages of retention at different temperatures. Also, the first embodiment allows that retention is performed in a temperature range lower than 500° C. on the precondition that the first intermediate retention is performed.

In the second intermediate retention, if the temperature is equal to or lower than 850° C., the effect of reducing the gap at a relatively high temperature described above cannot be obtained. Also, if the temperature exceeds 950° C., melting of the brazing material starts, and the retention becomes less meaningful. Thus, the second intermediate retention is performed in a temperature range of 850° C. to 950° C. (but not including 850° C.). The second intermediate retention is preferably performed in a temperature range of 860° C. to 940° C., and is more preferably performed in a temperature range of 880° C. to 920° C.

The second intermediate retention also allows two or more stages of retention at different temperatures.

[Slow Heating]

After the second intermediate retention and until the procedure makes a transition to the retaining process, the temperature increasing rate is made slower than the temperature increasing rate before the second intermediate retention. Since the brazing material starts to melt after the second intermediate retention, the temperature increasing rate is suppressed as much as possible to prevent a distribution of temperature from occurring in the assembly body. However, the temperature increasing rate in this case is also kept to be selected from the range of 20° C./hr. to 100° C./hr.

[Retaining Process (Solution Heat Treatment)]

The retaining process includes a function of retaining the base material (the impeller 10) and performing a solution heat treatment and also a function of melting the brazing material.

The retention temperature in the retaining process is selected from the range of 1000° C. to 1050° C. This range of the retention temperature basically complies with JIS G4303 stipulating a heat treatment of SUS630.

[Temperature Decreasing Process]

In the temperature decreasing process (a cooling process) after the retaining process, as with the temperature increasing process, the rate is preferably in a range of 20° C./hr. to 100° C./hr. to suppress a distribution of temperature in the assembly body. With this cooling rate, solving Cu in a base in SUS630, which is an object of the solution heat treatment, can be achieved.

In this temperature decreasing process, from the retention temperature to 950° C., the temperature is preferably decreased at a rate slower than the temperature decreasing rate at a lower temperature. This is to the same effect that the temperature is increased in a temperature range exceeding 950° C. at a rate slower than the rate therebefore in the temperature increasing process. To more clarify this effect, retention near 950° C., specifically in a range of 900° C. to 1000° C., for 0.5 to 2 hours can be provided.

In the temperature decreasing process, after the generated stress becomes equal to or lower than the strength of the brazing material and the temperature is decreased to a temperature range (for example, 600° C. or lower) where deformation is allowed without damage, cooling gas or others can be supplied to achieve a temperature decreasing rate equal to or higher than 100° C./hr.

Since the gold brazing material described above has a melting point of 900° C. to 1050° C., the brazing material is molten and solidified to braze the disk 11 and the cover 12 together in the process of the solution heat treatment including the temperature decreasing process. Note that for martensitic transformation of the structure, the temperature is required to be lowered to a Mf point (a martensitic transformation end temperature), which depends on the composition and the cooling rate but is approximately 32° C. After retention, the temperature is required to be cooled to be equal to or lower than this temperature Mf point.

<Age-Hardening Heat Treatment>

After the brazing (the solution heat treatment) ends as described above, an age-hardening heat treatment is performed next.

The age-hardening heat treatment is performed in conformance with JIS G4303. While temperatures in the age-hardening heat treatment are classified in JIS G4303 according to tensile strength and proof stress desired to be obtained, any temperature can be adopted in the present invention, and a temperature in the temperature range stipulated in JIS G4303 can be adopted.

Experiment Examples

The disk 11 and the cover 12 integrally formed with the blades 13 shown in FIG. 7A and FIG. 7B were prepared, brazing (a solution heat treatment) was performed under various conditions, with a brazing material (thickness: 100 μm) being interposed between the disk 11 and the blades 13, and then the state of brazing was checked with water-depth ultrasonic flaw detection for evaluation by using the following criteria.

○: no brazing defect observed
Δ: dotted brazing defects
x: scattered brazing defects The chemical composition of the steel material configuring the disk 11 and the cover 12 (the blades 13) for use and the composition of the brazing material are as follows. Brazing conditions (under vacuum) are as shown in FIG. 3.

Chemical Composition of the Steel Material (in Conformance with JIS SUS630):

15.5% Cr, 4.3% Ni, 3.5% Cu, 0.35% Nb+Ta, 0.05% C, 0.25% Si, 0.8% Mn, 0.0035% P, and 0.007% S The balance: Fe and inevitable impurities Composition of the brazing material: 18% Ni-82% Au Based on the results descried above, the present inventors have specified conditions of the thermal cycle at the time of brazing (solution heat treatment) as in the present invention.

2. Second Embodiment

Next, a second embodiment is described based on the attached drawings. Members and portions identical or similar to those in the first embodiment described above are not described herein, with the use of the same reference numerals.

<Assembly Body and Heating Jig>

Figure 4:
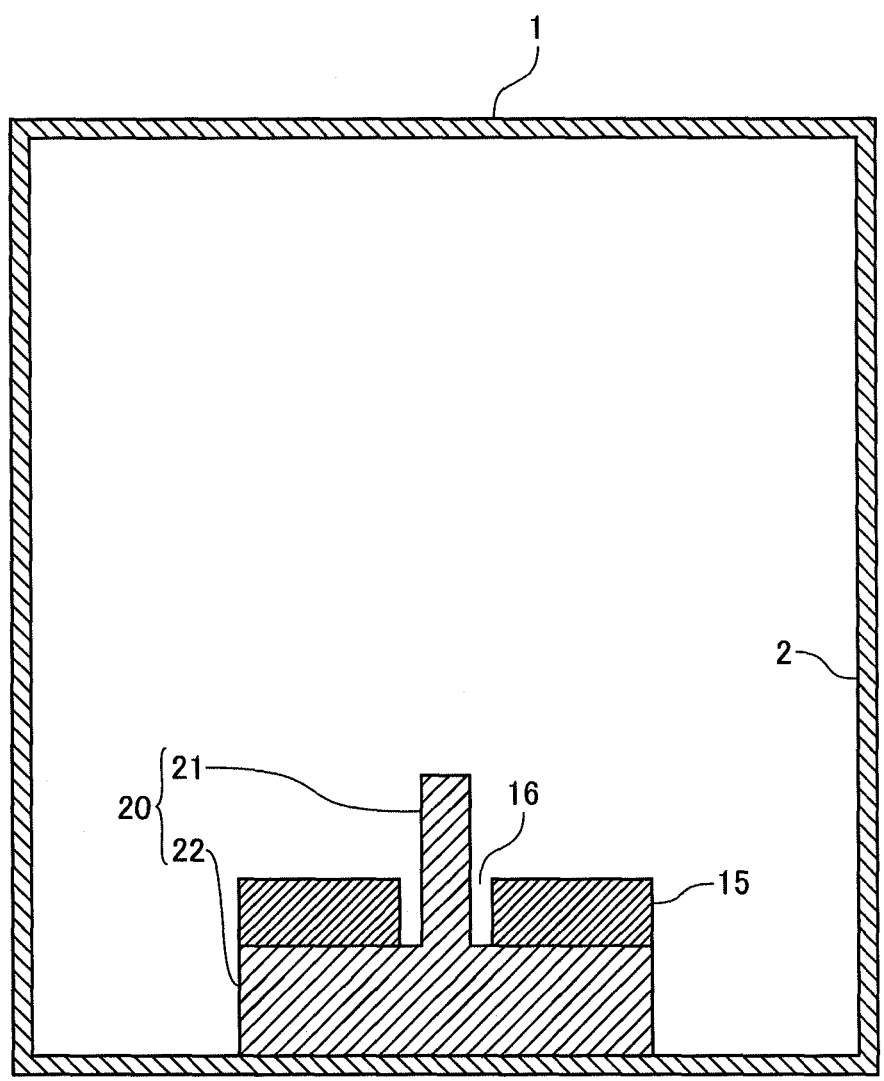
FIG. 4 is a sectional view of an assembly body and a heating jig accommodated in a heating furnace in the second embodiment.

By using materials similar to those in the first embodiment, the disk 11 and the cover 12 (the blades 13) formed with a method similar to that of the first embodiment being assembled with a brazing material interposed therebetween to obtain the assembly body 15. As shown in FIG. 4, the assembly body 15 placed on a heating jig 20 is accommodated in a heating furnace 1 that performs a heat treatment. Note in the present embodiment that a shaft hole 16 of the assembly body 15 described below is identical to the shaft hole 16 of the disk 11. Also, a side closer to the shaft hole 16 of the assembly body 15 is an inner circumferential side in the assembly body 15, and a side away therefrom is an outer circumferential side.

The heating jig 20 is formed of, as shown in FIG. 4, a cylindrical first heating unit (a first heating body) 21 to be inserted into the shaft hole 16 of the assembly body 15 and a disk-shaped second heating unit (a second heating body) 22 integrally provided with the first heating unit 21 and supporting the assembly body 15 from below in a vertical direction.

The heating jig 20 is made of a carbon with high thermal conductivity, and is heated by heat generated from a heater (not shown) provided on an inner side furnace wall 2 of the heating furnace 1 in a thermal cycle, which will be described further below. The heated first heating unit 21 heats the assembly body 15 from the inner circumferential side.

The heating jig 20 can be fabricated by individually fabricating the first heating unit 21 and the second heating unit 22 and then joining these together for integration, or can be fabricated with the first heating unit 21 and the second heating unit 22 integrated initially together.

As the material configuring the heating jig 20, in addition to the carbon, a metal material having heat resistance to 1000° C. or higher can be used.

While the size of the heating jig 20 is adjusted as appropriate according to the size of the assembly body 15 to be placed, a height ($h_1$) of the first heating unit 21 is preferably 0.5 times or higher than a height ($h_2$) of the assembly body 15 in a vertical direction. If $h_1$ is smaller than $0.5h_2$, heat of the heating furnace 1 is obstructed by the assembly body 15 to make the temperature of the first heating unit 21 less prone to increase, thereby making it impossible to sufficiently heat the assembly body 15 from the inner circumferential side.

By contrast, for example, if $h_1$ is increased so that the first heating unit 21 protrudes from the shaft hole 16 of the assembly body 15 as shown in FIG. 4, the first heating unit 21 is heated to a higher temperature because of directly receiving heat from the heater of the heating furnace 1. The heated first heating unit 21 heats the assembly body 15 from the inner circumferential side. As such, with the first heating unit 21 heating the inner circumferential side of the assembly body 15, the distribution of temperature on the inner circumferential side of the assembly body 15 and the outer circumferential side of the assembly body 15 heated by the heater of the heating furnace 1 can be made more uniform. With the distribution of temperature being made more uniform, a difference in heat distortion in the assembly body 15 is reduced, and extension of the space at the bond interface between the disk 11 and the cover 12 (the blades 13) is inhibited. As a result, the brazing material can be kept at that bond interface, and the disk 11 and the cover 12 can be excellently brazed together. Also, since the assembly body 15 is heated by the first heating unit 21 from the inner circumferential side, even if the temperature increasing rate of the thermal cycle is increased, a distribution of temperature is less prone to occur in the assembly body 15. Therefore, the temperature increasing rate of the thermal cycle can be increased, and the time required for the entire thermal cycle is reduced, thereby reducing manufacturing cost.

However, the effect of reducing the distribution of temperature is not obtained further if the first heating unit 21 is made too high. Also, it becomes less easy to place the assembly body 15 on the high heating jig 20, and the manufacturing cost of such heating jig 20 itself is increased. Therefore, the first heating unit 21 is preferably configured so that the height satisfies $0.5h_2 \leq h_1 \leq 20h_2$, more preferably $h_2 \leq h_1 \leq 10h_2$.

The first heating unit 21 is also preferably configured not to be in contact with the assembly body 15 when inserted into the shaft hole 16 of the assembly body 15. This is because, if the first heating unit 21 is in contact with the assembly body 15, the material configuring the first heating unit 21 such as carbon is moved to a surface layer of the assembly body 15 to possibly cause a change in composition of the assembly body 15. On the other hand, if the diameter of the first heating unit 21 is too small, a surface area of the first heating unit 21 exposed to the heater of the heating furnace 1 is decreased, and thus the assembly body 15 cannot be sufficiently heated from the inner circumferential side. Therefore, the size of the first heating unit 21 in a diameter direction is preferably configured to satisfy $0.4R_2 \leq R_1 < R_2$, more preferably, $0.8R_2 \leq R_1 < 0.95R_2$, where $R_1$ is the diameter of the first heating unit 21 and $R_2$ is the diameter of the shaft hole 16.

The second heating unit 22 is preferably configured to have a diameter equal to or larger than the outer diameter of the assembly body 15. With such configuration, the assembly body 15 is stably supported and a heat distortion (a warp) of the outer circumferential side of the assembly body 15 can be suppressed to some extent. The thickness of the second heating unit 22 is adjusted as appropriate according to the height ($h_1$) of the first heating unit 21 and the size of the heating furnace 1.

<Placement of Assembly Body to Heating Jig>

With the first heating unit 21 of the heating jig 20 being inserted into the shaft hole 16 of the assembly body 15, the assembly body 15 is placed on the heating jig 20. Here, between the second heating unit 22 and the assembly body 15, a spacer (not shown) formed of a ceramic or the like stable at a retention temperature, which will be described further below, can be interposed. This is because, if the assembly body 15 is mounted directly on the second heating unit 22, the material configuring the second heating unit 22 such as carbon is moved to the surface layer of the assembly body 15 to possibly cause a change in structure (composition) of the assembly body 15.

Note that while the assembly body 15 is placed on the heating jig 20 with a disk 11 side positioned upward, a cover 12 side may be positioned upward.

<Heat Treatment (Brazing Thermal Cycle)>

With the assembly body 15 placed on the heating jig 20 in the above-described manner being putted into the heating furnace 1, a heat treatment is started. The heat treatment is formed of two stages, that is, a solution heat treatment and an age-hardening heat treatment, as shown also in FIG. 1. In the second embodiment, the solution heat treatment is performed under vacuum, and the age-hardening heat treatment is performed under vacuum or a pressure equivalent to atmospheric pressure. A brazing thermal cycle is performed so as to serve as this solution heat treatment. These cycle and treatment are hereinafter collectively referred to a brazing thermal cycle. The age-hardening heat treatment can be performed after the brazing thermal cycle (the solution heat treatment) ends. Suitable conditions of a series of heat treatments in the second embodiment are described below.

[Brazing Thermal Cycle]

Figure 5:
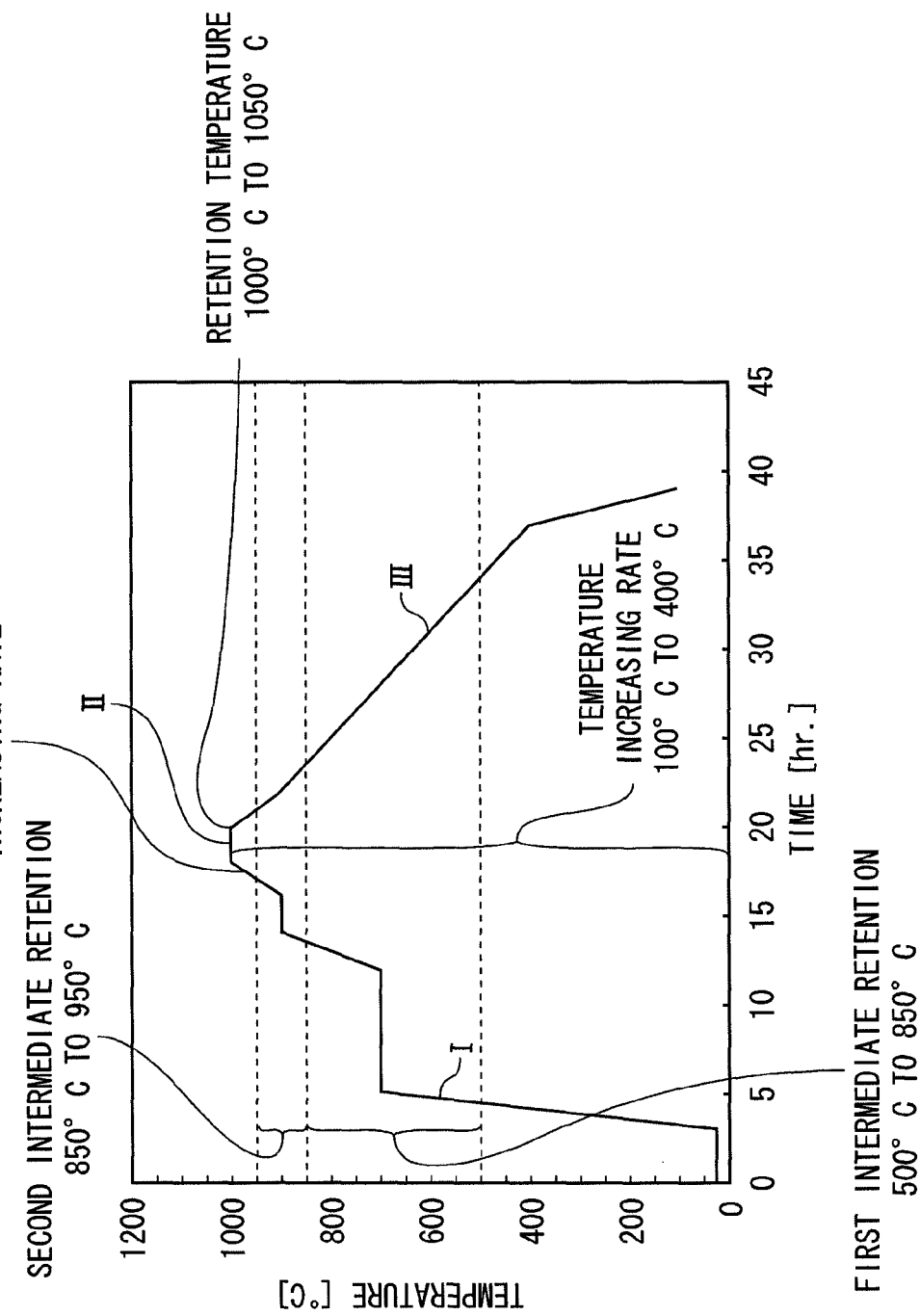
FIG. 5 is a drawing of one pattern of a thermal cycle at the time of brazing (a solution heat treatment) in the second embodiment.

As shown in FIG. 5, the brazing thermal cycle can be sectioned into a temperature increasing process (I), a retaining process (II), and a temperature decreasing process (III).

The temperature increasing process is normally started from a room temperature, and the temperature inside the heating furnace 1 (the assembly body 15 and the heating jig 20) is increased to a retention temperature.

[Temperature Increasing Process]

In the second embodiment, by using the heating jig 20, even if a temperature increasing rate is set in a range of 100° C./hr. to 400° C./hr., which is higher than the range of the temperature increasing rate in the temperature increasing process of the first embodiment, it is possible to prevent a distribution of temperature from occurring in the assembly body 15 during the temperature increasing process or, even if it occurs, it is possible to suppress to the extent that the brazing material does not leak from the bond interface. The temperature increasing rate in the temperature increasing process can be preferably 120° C./hr. to 380° C./hr., more preferably 140° C./hr. to 360° C./hr.

The time required for the temperature increasing process depends on the temperature increasing rate, the time required for intermediate retention described next, or the size of the impeller 10, and therefore cannot be uniquely determined. However, in consideration of the manufacturing cost of the impeller 10, thirty hours or less are desired.

The temperature increasing rate described above is applied throughout the temperature increasing process. That is, the temperature increasing rate is applied from the time when the temperature increase starts to the time until the retention temperature (the retaining process). However, this temperature increasing rate is not applied during the intermediate retention described next. The temperature increasing rate is not required to be constant, and can be fluctuated in a range of 100° C./hr. to 400° C./hr. Typically, in a temperature range exceeding 950° C., a temperature increasing rate slower than that in a lower temperature range is selected.

[Intermediate Retention]

In the temperature increasing process, intermediate retention for keeping the temperature can be provided. With the provision of the intermediate retention, the distribution of temperature of the assembly body 15 can be made closer to be uniform. The intermediate retention can be performed in a temperature range of 500° C. to 950° C.

In the second embodiment, as with the first embodiment, the intermediate retention is allowed to be divided into two stages (hereinafter, a first stage of intermediate retention is referred to as a first intermediation retention and a second stage of intermediate retention is referred to as a second intermediate retention).

The first intermediate retention can be performed in a temperature range of 500° C. to 850° C. The reason why the first intermediate retention can be set in this temperature range is as described in the first embodiment. By performing the first intermediate retention at a temperature lower than the temperature range in which the brazing material is molten (approximately 950° C.), an effect of reducing the gap at a relatively low temperature can be obtained. The first intermediate retention is performed preferably in a temperature range of 550° C. to 750° C., more preferably in a temperature range of 550° C. to 700° C.

The second intermediate retention can be performed in a temperature range of 850° C. to 950° C. (but not including 850° C.). The reason why the second intermediate retention can be set in this temperature range is as described in the first embodiment. In the temperature increasing process, the distribution of temperature occurring to the assembly body 15 is increased as the temperature is relatively increased. Therefore, by providing the second intermediate retention in a high temperature range, the temperature of the assembly body 15 can be made further uniform. The second intermediate retention can be performed preferably in a temperature range of 860° C. to 940° C., and can be performed more preferably in a temperature range of 880° C. to 920° C.

While a retention time in the first intermediate retention should be determined according to the size of the assembly body 15 or the like, the effect of making the temperature uniform is insufficient with a short time, and making the temperature uniform can be achieved in a certain time. Thus, the retention time of one to ten hours is preferable. A more preferable retention time is two to eight hours. This retention time is similarly applied to the second intermediate retention time.

[Slow Heating]

After the first intermediate retention and until the procedure makes a transition to the retaining process, the temperature increasing rate can be made slower than the temperature increasing rate prior to the first intermediate retention. Since the brazing material starts to melt after the second intermediate retention, the temperature increasing rate is suppressed as much as possible to prevent a distribution of temperature from occurring in the assembly body 15. However, the temperature increasing rate in this case is also preferably selected from the range of 100° C./hr. to 400° C./hr. Note that the same applies to the temperature increasing rate after the second intermediate retention and until the procedure makes a transition to the retaining process.

[Retaining Process (Solution Heat Treatment)]

The retaining process includes a function of retaining the base material (the impeller 10) and performing a solution heat treatment and also a function of melting the brazing material.

A retention temperature in the retaining process can be selected from a range of 1000° C. to 1050° C. This range of the retention temperature basically complies with JIS G4303 stipulating a heat treatment of SUS630. A retention time at this temperature can be selected preferably from a range of 0.5 to 3 hours.

[Temperature Decreasing Process]

In the temperature decreasing process after the retaining process, the rate is preferably in a range of 20° C./hr. to 100° C./hr. to suppress a distribution of temperature in the assembly body 15. With this temperature decreasing rate, solving Cu in a base in SUS630, which is an object of the solution heat treatment, can be achieved.

In the temperature decreasing process, from the retention temperature to 950° C., the temperature is preferably decreased at a rate slower than the temperature decreasing rate at a lower temperature. This is to the same effect that the temperature is increased in a temperature range exceeding 950° C. at a rate slower than the rate therebefore in the temperature increasing process. To more clarify this effect, retention near 950° C., specifically in a range of 930° C. to 970° C., for 0.5 to 2 hours can be provided.

In the temperature decreasing process, after the temperature is decreased to 600° C. or lower, cooling gas or others can be supplied to achieve a temperature decreasing rate equal to or higher than 100° C./hr.

Since the gold brazing material described above has a melting point of 900° C. to 1050° C., the brazing material is molten and solidified to braze the disk 11 and the cover 12 together in the solution heat treatment process and the temperature decreasing process. Note that for martensitic transformation of the structure, the temperature is required to be lowered to a Mf point (a martensitic transformation end temperature), which depends on the composition and the cooling rate but is approximately 32° C. After retention, the temperature is required to be cooled to be equal to or lower than this temperature Mf point.

[Retaining Process (Age-Hardening Heat Treatment)]

Upon completion of brazing (solution heat treatment) as above, an age-hardening heat treatment is performed next.

The age-hardening heat treatment is performed in conformance with JIS G4303. While temperatures in the age-hardening heat treatment are classified in JIS G4303 according to tensile strength and proof stress desired to be obtained, any temperature can be adopted in the second embodiment, and a temperature in the temperature range stipulated in JIS G4303 can be adopted.

Experiment Examples

The disk 11 and the cover 12 integrally formed with the blades 13 shown in FIG. 7A and FIG. 7B were prepared and, with a brazing material (thickness: 100 μm) being interposed between the disk 11 and the blades 13, the assembly body 15 was obtained. With the assembly body 15 being placed on the carbon-made heating jig 20, brazing (a solution heat treatment) was performed under various conditions, and then the state of brazing was checked with water-depth ultrasonic flaw detection for evaluation by using the following criteria.

○: no brazing defect observed
Δ: dotted brazing defects
x: scattered brazing defects The chemical composition of the steel material configuring the disk 11 and the cover 12 (the blades 13) for use and the composition of the brazing material are as follows. The height ($h_1$) of the first heating unit 21 of the heating jig 20 and brazing conditions (under vacuum) are as shown in FIG. 6.

Chemical Composition of the Steel Material (in Conformance with JIS SUS630):
    15.5% Cr, 4.3% Ni, 3.5% Cu, 0.35% Nb+Ta
    0.05% C, 0.25% Si, 0.8% Mn, 0.0035% P, and 0.007% S
    The balance: Fe and inevitable impurities
    Composition of the brazing material: 18% Ni-82% Au As shown in FIG. 6, from Test Sample Nos. 1 to 9, it has been clarified that brazing is excellently performed by performing a heat treatment with the first heating unit 21 being provided. It has also been clarified that brazing is excellently performed even if a heat treatment is performed at a temperature increasing rate in a range higher than the range of the temperature increasing rate in the temperature increasing process of the first embodiment. Furthermore, from Test Sample Nos. 10 and 11, it has been found that, when the temperature increasing rate is increased, brazing is more excellently performed if the height ($h_1$) of the first heating unit 21 is higher.

Note that while the temperature of the first heating unit 21 is increased by heat generated from the heater of the heating furnace 1 to heat the inner circumferential side of the assembly body 15 in the second embodiment described above, the structure is not restricted to this structure. For example, a cylindrical carbon heater producing heat by itself can be used as the first heating unit 21. Alternatively, not only the first heating unit 21 but also the entire heating jig 20 including the second heating unit 22 can be made as a heater producing heat by itself.

Furthermore, it goes without saying that the first heating unit 21 (the heating jig 20) can be placed to perform a brazing thermal cycle on the assembly body 15 in the first embodiment described above, as in the second embodiment.

Other than the above, any of the structures enumerated in the embodiments above can be selected or omitted or changed as appropriate to another structure as long as such selection, omission, or change does not deviate from the gist of the present invention.

REFERENCE SIGNS LIST 10 impeller
11 disk
12 cover
13 blade
14 brazing part
15 assembly body
16 shaft hole

The invention claimed is:

1. An impeller manufacturing method in which a thermal cycle is performed, for bonding, on an assembly body with a brazing material interposed at a bond portion between at least two impeller constituent members, wherein
    the thermal cycle includes:
    a temperature increasing process of increasing a temperature to a retention temperature;
    a retaining process of retaining at the retention temperature in a temperature range equal to or higher than a melting temperature of the brazing material; and
    a temperature decreasing process of decreasing the temperature from the retention temperature to a room temperature, and
    the thermal cycle is performed with the assembly body being placed with respect to a first heating body heating the assembly body from an inner circumferential side of the assembly body,
    wherein, in the temperature decreasing process, a retention is performed in a temperature range of 930° C. to 970° C. for 0.5 to 2 hours,
    wherein the first heating body is configured to protrude from a shaft hole of the assembly body such that the first heating body is heated by directly receiving heat generated externally,
    wherein the first heating body is integrally provided together with a second heating body supporting the assembly body from below in a vertical direction, and
    wherein the first heating body and the second heating body are configured to be a heating jig that is made of a carbon, the heating jig heated by heat generated externally.

2. The impeller manufacturing method according to claim 1, wherein the first heating body satisfies $0.5\,h_2 \le h_1 \le 20 h_2$, where $h_1$ is a height of the first heating body and $h_2$, is a height of the assembly body.

3. The impeller manufacturing method according to claim 1, wherein the first heating body satisfies $h_2 \le h_1 \le 10 h_2$, where $h_1$ is a height of the first heating body and $h_2$ is a height of the assembly body.

4. The impeller manufacturing method according to claim 1, wherein a size of the first heating body in a diameter direction is configured to satisfy $0.4 R_2 \le R_1 < R_2$, where $R_1$ is a diameter of the first heating body and $R_2$ is a diameter of a shaft hole of the assembly body.

5. The impeller manufacturing method according to claim 1, wherein a size of the first heating body in a diameter direction is configured to satisfy $0.8 R_2 \le R_1 < 0.95 R_2$, where $R_1$ is a diameter of the first heating body and $R_2$ is a diameter of a shaft hole of the assembly body.

6. The impeller manufacturing method according to claim 1, wherein the second heating body is disk-shaped, and is configured to have a diameter equal to or larger than an outside diameter of the assembly body.

7. The impeller manufacturing method according to claim 1, wherein a spacer is interposed between the second heating body and the assembly body.

8. The impeller manufacturing method according to claim 1, wherein, in the temperature decreasing process, the retention is performed at a temperature of approximately 950° C.

* * * * *